(12) United States Patent
Liu et al.

(10) Patent No.: US 10,133,334 B2
(45) Date of Patent: Nov. 20, 2018

(54) EVENT-BASED SENSOR AND OPERATING METHOD OF PROCESSOR

(71) Applicants: SAMSUNG ELECTRONICS CO., LTD., Suwon-si (KR); Universitaet Zuerich, Zurich (CH)

(72) Inventors: Hongjie Liu, Zurich (CH); Chenghan Li, Zurich (CH); Christian Brandli, Zurich (CH); Shih-Chii Liu, Zurich (CH); Tobi Delbruck, Zurich (CH)

(73) Assignees: SAMSUNG ELECTRONICS CO., LTD., Suwon-si (KR); UNIVERSITAET ZUERICH, Zurich (CH)

(*) Notice: Subject to any disclaimer, the term of this patent is extended or adjusted under 35 U.S.C. 154(b) by 28 days.

(21) Appl. No.: 14/862,274

(22) Filed: Sep. 23, 2015

(65) Prior Publication Data

US 2016/0274643 A1 Sep. 22, 2016

(30) Foreign Application Priority Data

Mar. 18, 2015 (KR) .................. 10-2015-0037501

(51) Int. Cl.
| | |
|---|---|
| G09G 5/00 | (2006.01) |
| G06F 1/32 | (2006.01) |
| G06F 3/01 | (2006.01) |
| G06F 3/00 | (2006.01) |
| G06F 3/041 | (2006.01) |
| G06F 3/042 | (2006.01) |

(52) U.S. Cl.
CPC .......... *G06F 1/3215* (2013.01); *G06F 1/3262* (2013.01); *G06F 3/005* (2013.01); *G06F 3/017* (2013.01); *G06F 3/042* (2013.01); *G06F 3/0416* (2013.01)

(58) Field of Classification Search
CPC ........ G06F 1/3215; G06F 1/325; G06F 3/017; G06F 3/0412; G06F 3/042; G06F 3/0421
See application file for complete search history.

(56) References Cited

U.S. PATENT DOCUMENTS

| | | | |
|---|---|---|---|
| 7,265,755 | B2 | 9/2007 | Peterson |
| 7,728,269 | B2 | 6/2010 | Lichtsteiner et al. |
| 8,121,424 | B2 | 2/2012 | Almbladh |
| 8,300,935 | B2 | 10/2012 | Distante et al. |
| 8,638,342 | B2 | 1/2014 | Cote et al. |
| 2003/0189655 | A1 | 10/2003 | Lim et al. |
| 2010/0182282 | A1* | 7/2010 | Kurokawa .......... G02F 1/13338 345/175 |

(Continued)

OTHER PUBLICATIONS

Hongjie Liu et al., "Design of a Spatiotemporal Correlation Filter for Event-based Sensors", Circuits & Systems (ISCAS) 2015 IEEE Intl' Symposium, May 24-27, 2015; pp. 722-725.

*Primary Examiner* — Adam R Giesy
(74) *Attorney, Agent, or Firm* — Sughrue Mion, PLLC

(57) ABSTRACT

An event-based sensor is provided and may include a sensor configured to generate an event signal that includes identification information that relates to an active pixel that detects an event from among a plurality of sensing pixels, a determiner configured to determine whether the event signal is to be filtered based on a predetermined condition, and an outputter configured to output the event signal based on a result of the determination.

15 Claims, 9 Drawing Sheets

(56) References Cited

U.S. PATENT DOCUMENTS

| | | | |
|---|---|---|---|
| 2012/0212450 A1* | 8/2012 | Takami | G06F 3/04883 345/174 |
| 2013/0177237 A1 | 7/2013 | Schamp | |
| 2014/0078108 A1* | 3/2014 | Hotelling | G06F 3/0416 345/174 |
| 2014/0085447 A1 | 3/2014 | Lorach et al. | |
| 2014/0085454 A1 | 3/2014 | Lim et al. | |
| 2014/0096231 A1* | 4/2014 | Smith | G06F 21/00 726/16 |
| 2014/0160325 A1 | 6/2014 | Hirai et al. | |
| 2014/0320403 A1 | 10/2014 | Lee et al. | |
| 2014/0354537 A1 | 12/2014 | Park et al. | |

* cited by examiner

EVENT-BASED SENSOR AND OPERATING METHOD OF PROCESSOR

CROSS-REFERENCE TO RELATED APPLICATION

This application claims priority from Korean Patent Application No. 10-2015-0037501, filed on Mar. 18, 2015, in the Korean Intellectual Property Office, the disclosure of which is incorporated herein by reference in its entirety.

BACKGROUND

1. Field

Methods and apparatuses consistent with exemplary embodiments relate to an event-based sensor and an operating method of a processor.

2. Description of the Related Art

Human-computer interaction (HCI) occurring between humans and computers may be implemented via a user interface. For example, a user interface that recognizes a user input may facilitate natural interaction between users and computers.

To recognize the input, any of various sensors may be used. To facilitate a natural interaction, a sensor having a fast response speed with respect to the user input is necessary. Further, in a case of various mobile devices, consuming less power while enabling a performance of various smart functions via the user interface may be required. Accordingly, a sensor that consumes less power, has a fast response speed, and has a high reliability with respect to a sensing purpose may be required.

SUMMARY

Exemplary embodiments may address at least the above problems and/or disadvantages and other disadvantages not described above. In addition, the exemplary embodiments are not required to overcome the disadvantages described above, and an exemplary embodiment may not overcome any of the problems described above.

According to an aspect of an exemplary embodiment, there is provided an event-based sensor that includes a sensor module configured to generate an event signal that includes identification information that relates to an active pixel that detects an event, the active pixel being included among a plurality of sensing pixels, a determiner configured to determine whether the event signal is to be filtered based on a predetermined condition, and an outputter configured to output the event signal based on a result of the determination.

The predetermined condition may include at least one from among a first condition that relates to a time at which the event is detected, a second condition that relates to a space in which the event is detected, and a third condition based on a spatiotemporal correlation among respective occurrences of the event.

The first condition may include at least one from among information indicating whether a current occurrence of the event is detected in a time interval of a predetermined pattern, information indicating whether a current occurrence of the event is detected within a predetermined time interval with respect to a time at which a preceding occurrence of the event was detected, and information indicating whether a current occurrence of the event is detected in a time interval associated with at least one temporal characteristic of respective occurrences of the event.

The second condition may include at least one from among information indicating whether a current occurrence of the event is detected in a region of a predetermined pattern, information indicating whether a current occurrence of the event is detected in a region of a predetermined range with respect to a location at which a preceding occurrence of the event was detected, information indicating whether a current occurrence of the event is detected in a region that corresponds to an outline of an object, and information indicating whether a current occurrence of the event is detected in a region associated with a spatial characteristic of respective occurrences of the event.

The third condition may include information indicating whether a current occurrence of the event is detected within a predetermined time interval with respect to a time at which a preceding occurrence of the event was detected within a predetermined region. The predetermined region may include at least one of an adjacent region including a location at which the current occurrence of the event is detected, and a region of a predetermined pattern including the location at which the current occurrence of the event is detected.

The sensor module may be further configured to transmit the event signal to the determiner in response to the event, the determiner may be further configured to determine, in response to receiving the event signal, whether the event signal is filtered, and to transmit, to the outputter, a pass logic signal including a result of the determination in response to a pass enable signal received from the outputter, and the outputter may be further configured output the event signal based on the received pass logic signal.

The outputter may be further configured to transmit, to the determiner, a response signal after the event signal has been output, and the determiner may be further configured to reset a parameter that relates to determining the predetermined condition in response to receiving the response signal.

The determiner may include filter cells configured to divide the plurality of sensing pixels into a predetermined pattern, and each of the filter cells may be configured to determine whether the event signal is to be filtered.

Each of the filter cells may include a comparer, a first switch configured to connect an output of the comparer to a first input of the comparer in response to receiving, from the outputter, a response signal that is associated with a previous occurrence of the event, and to disconnect the output of the comparer from the first input of the comparer in response to receiving, from the sensor module, a suspension of a request signal that is associated with a preceding occurrence of the event, a second switch configured to connect a second input of the comparer to a reset voltage in response to receiving the response signal, and to connect the second input of the comparer to a threshold voltage in response to receiving the event signal, a capacitor connected to the second input of the comparer, and a transistor configured to discharge a charge from the capacitor based on a predetermined current capacity.

The current capacity may be set based on at least one from among a gate voltage of the transistor and a source voltage of the transistor.

According to another aspect of an exemplary embodiment, there may be provided an operating method that is performable by using a processor, the method including receiving an event signal generated by an event-based sensor, determining, by the processor, whether the event signal is to be filtered based on at least one from among a first condition that relates to a time at which a current occurrence of an event is detected, a second condition that relates to a space in which the current occurrence of the event is detected, and a third condition based on a spatiotemporal correlation among respective occurrences of the event, and outputting a result of the determination.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which.

DETAILED DESCRIPTION

Figure 1:
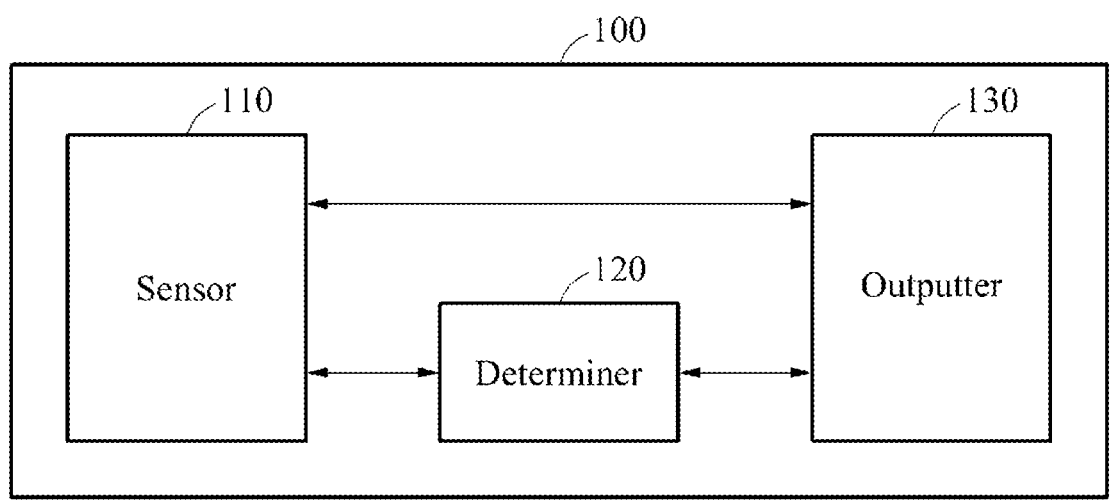
FIG. 1 is a block diagram illustrating an event-based sensor, according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be apparent to those of ordinary skill in the art. The progression of processing steps and/or operations described is an example; however, the sequence of and/or operations is not limited to that set forth herein and may be varied as is known in the art, with the exception of steps and/or operations necessarily occurring in a particular order. In addition, respective descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the present disclosure.

It will be understood that when an element is referred to as being "connected" or "coupled" to another element, it can be directly connected or coupled to the other element, or, alternatively, intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

The terminology used herein is for the purpose of describing particular exemplary embodiments only and is not intended to be limiting of the present inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present disclosure, and will not be interpreted in an idealized or overly formal sense unless expressly so defined herein.

Reference will now be made in detail to the exemplary embodiments, examples of which are illustrated in the accompanying drawings, wherein like reference numerals refer to the like elements throughout. Exemplary embodiments are described below in order to explain the exemplary embodiments by referring to the figures.

FIG. 1 is a block diagram illustrating an event-based sensor 100, according to an exemplary embodiment. Referring to FIG. 1, the event-based sensor 100 includes a sensor (also referred to herein as a "sensor module") 110, a determiner 120, and an outputter 130. Hereinafter, a structure and an operation of the event-based sensor will be described for ease of description, exemplary embodiments may be extended to various apparatuses which are not sensors. For example, exemplary embodiments may be applied to any of various computing devices, smartphones, mobile apparatuses, such as wearable devices, and various security apparatuses including an event-based sensor.

The sensor 110 includes a plurality of sensing pixels. The sensor 110 generates an event signal that includes identification information that relates to an active pixel that detects an event, the active pixel being included among the plurality of sensing pixels. The sensor 110 may be provided based on a neuromorphic sensing scheme. In an example, the sensor 110 may be provided with 128×128 pixel array that includes sensing pixels in sizes of 20×20 square micrometers ($\mu m^2$).

The event may include an event that is associated with a change of an input. For example, an event may include any of an event in which an intensity of incident light is changed, an event in which a color of incident light is changed, an event in which an intensity of sound to be input is changed, an event in which a frequency of sound to be input is changed, and an event in which intensity of stimulation to be input is changed. Hereinafter, the sensor 110 is assumed to be an event-based vision sensor configured to detect an event in which an intensity of incident light is changed for ease of description, exemplary embodiments may be applied to various event-based sensors.

The plurality of sensing pixels included in the sensor 110 may detect an event, for example, an event in which an intensity of incident light is changed. With respect to the plurality of sensing pixels, a sensing pixel that detects an event may be referred to as an active pixel. The active pixel may generate an activation signal in response to a detection of an event.

The sensor 110 generates an event signal that includes identification information that relates to an active pixel. For example, the sensor 110 may generate, based on an activation signal generated by an active pixel, an event signal that includes an address that identifies the active pixel. Since the sensor 110 time-asynchronously generates and outputs the event signal, the sensor 110 may operate in a relatively low power and at a relatively high speed compared to a frame-based vision sensor in order to scan every pixel in each frame.

The determiner 120 determines whether an event signal is to be performed based on a predetermined condition. For example, the determiner 120 may determine to pass an event signal in response a predetermined condition that is determined to be satisfied, or determine to filter the event signal in response to the predetermined condition that is determined to be unsatisfied. Hereinafter, passing an event signal corresponds to outputting a received event signal and filtering the event signal corresponds to blocking the received event signal irrespective of outputting the received event signal. In such an example, the determiner 120 may determine whether the event signal is to be output based on the predetermined condition.

The predetermined condition includes a first condition that is associated with a time at which an occurrence of the event is detected. In an example, the determiner 120 may determine whether an event signal is to be filtered based on information that indicates whether a current occurrence of the event is detected in a time interval of a predetermined pattern. The time interval of the predetermined pattern may be variably set. For example, the predetermined pattern may include a first interval and a second interval. An event signal generated within the first interval that is included in the predetermined interval may be passed, and an event signal generated within the second interval that is included in the predetermined interval may be filtered. Lengths of the first interval and the second interval may be set in any of a variety of manners. The predetermined pattern may further include additional intervals other than the first interval and the second interval.

Alternatively, the determiner 120 determines whether an event signal is to be filtered based on information that indicates whether a current occurrence of the event is detected within a predetermined time interval with respect to a time at which a preceding occurrence of the event was detected. In such an example, the current event signal may be passed when the current occurrence of the event is detected within the predetermined time interval with respect to the time at which the preceding occurrence of the event was detected, and the current event signal may be filtered when the current occurrence of the event is detected in an interval other than the predetermined time interval with respect to the time at which the preceding occurrence of the event was detected.

The determiner 120 determines whether an event signal is to be filtered based on information that indicates whether a current occurrence of the event is detected in a time interval associated with at least one temporal characteristic of respective occurrences of the event. For example, the determiner 120 may extract a characteristic vector of event occurrences as time elapses. The event signal may be passed when the current occurrence of the event corresponds to the characteristic vector of the event occurrences as time elapses, and the current event signal may be filtered when the current occurrence of the event does not correspond to the characteristic vector of the event occurrences as time elapses. The characteristic vector of the event occurrences as time elapses may include a speed element, for example, an optical flow. The optical flow is a characteristic vector that indicates a degree of a change in brightness of light incident to each pixel as time elapses.

The predetermined condition includes a second condition that is associated with a space in which an occurrence of the event is detected. The determiner 120 determines whether an event signal is to be filtered based on information that indicates whether a current occurrence of the event is detected in a region of a predetermined pattern. The region of the predetermined pattern may be set in a variety of manners. In an example, the region of the predetermined pattern may include a region that corresponds to a predetermined pattern, such as, for example, an outline of an object. In such an example, an event signal generated in the region of the predetermined pattern may be passed, and an event signal generated outside of the region of the predetermined pattern may be filtered.

Alternatively, the determiner 120 determines whether an event signal is to be filtered based on information that indicates whether a current occurrence of the event is detected in a region of a predetermined range with respect to a location at which a preceding occurrence of the event was detected. In such an example, whether the current event signal is to be filtered may be determined based on a spatial correlation between the preceding occurrence of the event and the current occurrence of the event. For example, an event signal generated within a predetermined region adjacent to a location at which a preceding occurrence of the event was detected may be passed, and an event signal generated outside of the predetermined region adjacent to the location at which the preceding occurrence of the event was detected may be filtered.

Alternatively, the determiner 120 determines whether an event signal is to be filtered based on information that indicates whether a current occurrence of the event is detected in a region that corresponds to an outline of an object. For example, the determiner 120 may perform edge detection on an edge or an outline of an object based on respective occurrences of the event. An event signal may be passed when a current occurrence of the event corresponds to an edge or an outline of an object, and a current event signal may be filtered when the current occurrence of the event does not correspond to the outline of the object or edges of respective occurrences of the event. The determiner 120 may extract an attribute of an edge, for example, an orientation of an edge, based on respective occurrences of the event. The determiner 120 may also determine whether the current event signal is to be filtered based on information that indicates whether the current occurrence of the event corresponds to the extracted attribute of the edge.

Alternatively, the determiner 120 determines whether an event signal is to be filtered based on information that indicates whether a current occurrence of the event is detected in a region associated with at least one spatial characteristic of respective occurrences of the event. For example, the determiner 120 may extract a characteristic vector based on a spatial distribution of respective occurrences of the event. An event signal may be passed when a current occurrence of the event corresponds to a characteristic vector based on a spatial distribution of respective occurrences of the event, and a current event signal may be filtered when the current occurrence of the event does not correspond to the characteristic vector based on the spatial distribution of respective occurrences of the event.

The predetermined condition includes a third condition based on a spatiotemporal correlation among respective occurrences of the event. In an example, the determiner 120 determines whether an event signal is to be filtered based on information that indicates whether a current occurrence of the event is detected within a predetermined time interval with respect to a time at which a preceding occurrence of the event is detected within a predetermined region. The predetermined region may include an adjacent region that includes a location at which the current occurrence of the event is detected or a region of a predetermined pattern that includes the location at which the current occurrence of the event is detected. Here, the predetermined pattern may be variously set. Related descriptions of the third condition will be provided hereinafter.

The outputter 130 may extract an event signal based on a result of the determination of the determiner 120. For example, the outputter 130 may output an output signal based on a determination in which the event signal is passed. Alternatively, the outputter 130 may not output the event signal based on a determination in which the event signal is filtered.

As described above, the predetermined condition used by the determiner 120 may be variably set according to a use and a purpose of the event-based sensor 100. The event-based sensor 100 may selectively output event signals appropriate for the use and the purpose of the event-based sensor 100 with respect to events detected by the sensor 110.

Hereinafter, examples in which the determiner 120 of the event-based sensor 100 filters an event signal that corresponds to background activity (BA) among event signals output by the event-based sensor 100 will be provided in detail. An event-based vision sensor may output a first event signal that corresponds to real activity and a second event signal that corresponds to the BA. For example, an event signal that corresponds to BA may be generated by a junction leakage current or thermal noise attributed to switches connected to floating nodes in sensing pixels of the sensor 110.

The event-based sensor 100 may generate a pass flag that identifies event signals spatiotemporally associated with each other in order to filter the event signal that corresponds to the BA. Accordingly, the event-based sensor 100 may reduce a communication and computation load and enhance an information rate.

The event-based sensor 100 may use a power-gating scheme. The power-gating scheme is a scheme that minimizes power consumption by activating a communication circuit and a threshold detection circuit that correspond to a sensing pixel detecting an event. The event-based sensor 100 may use a correlation filter chip. The event-based sensor 100 may be applied to an embedded neuromorphic visual and auditory system that requires less power consumption and a relatively fast response speed by using the correlation filter chip.

Figure 2:
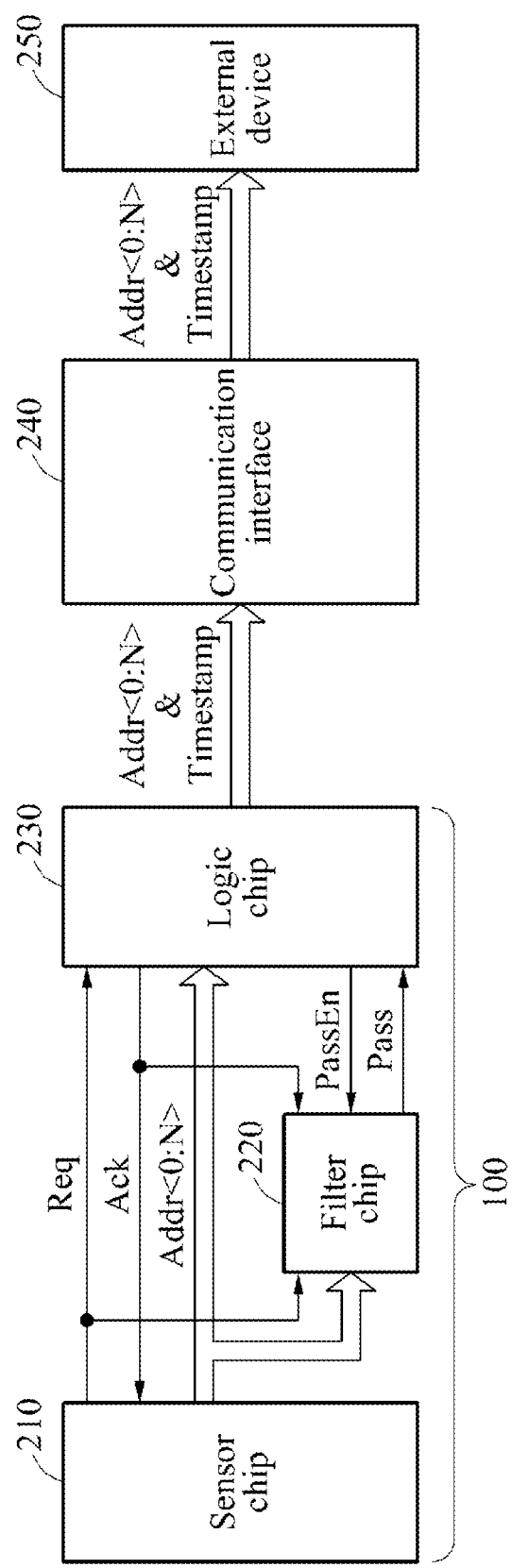
FIG. 2 is a diagram illustrating an event-based sensor that includes a hardware filter solution, according to an exemplary embodiment.

FIG. 2 is a diagram illustrating an event-based sensor 100 that includes a hardware filter solution, according to an exemplary embodiment. Referring to FIG. 2, the event-based sensor 100 includes a sensor chip 210, a filter chip 220, and a logic chip 230. For ease of description, examples of the event-based sensor 100 which include a plurality of chips are described. However, the event-based sensor 100 may be provided in a single chip. The sensor chip 210 corresponds to the sensor module 110 in FIG. 1, the filter chip 220 corresponds to the determiner 120 in FIG. 1, and the logic chip 230 corresponds to the outputter 130 in FIG. 1.

The sensor chip 210 may generate asynchronous address events (AE) signals by using active pixels. For example, the sensor chip 210 may generate an event signal ON or an event signal OFF when an amount of change in a logarithmic intensity exceeds an upper threshold or a lower threshold subsequent to a preceding occurrence of an event. When the sensor chip 210 interfaces with a synchronous system, timing information that relates to an event signal may be additionally generated by the logic chip 230. Since the sensor chip 210 has a sparse and low-latency output characteristic, an object tracking application at high speed may require a feedback with a relatively low latency, such as, for example, high speed robotics.

However, an output of the sensor chip 210 may include an event signal that corresponds to background activity (BA), and not an event signal that corresponds to real activity. The BA may influence data quality, and resources may be consumed in unnecessary communication and calculation due to the BA. In an example, since a junction leakage current may be doubled for every 6 to 8 degrees Celsius increase in temperature, an amount of noise may extensively increase according to the increase in the temperature. When a scale of complementary metal-oxide-semiconductor (CMOS) technology is smaller, the junction leakage current and a BA rate may increase. Also, tracking results may be inaccurate due to the BA.

The event that corresponds to the real activity may be generated due to a movement of an object or a change in lighting. In such an example, the event that corresponds to the real activity and is detected in a predetermined pixel may have a temporal correlation with events that are detected in spatial neighbor pixels of the predetermined pixel. Conversely, an event that corresponds to the BA and is detected in the predetermined pixel may have no temporal correlation with the events that are detected in the spatial neighbor pixels of the predetermined pixel. Based on the difference, the event-based sensor 100 may filter the event signal that corresponds to the BA by identifying events having no spatiotemporal correlation.

The event-based sensor 100 may operate in a hand shaking scheme. For example, the sensor chip 210 may transmit an event signal to the filter chip 220 and the logic chip 230 by activating an event request signal Req and providing event address bits Addr<0:N>. The filter chip 220 may generate a logic signal Pass after the event signal has been processed and transmit the pass logic signal Pass to the logic chip 230. The logic chip 230 may transmit a response signal Ack to the sensor chip 210 and the filter chip 220. The logic chip 230 may tag a timestamp on related event signals, for example, event signals for which a pass logic signal is tagged to have a logic value 1. Technology for filtering the event signal that corresponds to the BA may be provided in lieu of reducing a maximum throughput rate of the system. The event signals tagged with respect to the pass logic signal having the logic value 1 may be transmitted to an external device 250 via communication interface 240.

The filter chip 220 may include a plurality of filter cells. A filter cell may combine programmable spatial sub-sampling and a temporal window in order to use the spatiotemporal correlation principle. The filter cell may operate based on a current integration. The programmable spatial sub-sampling and the temporal window may be programmed in a variety of manners.

Figure 3:
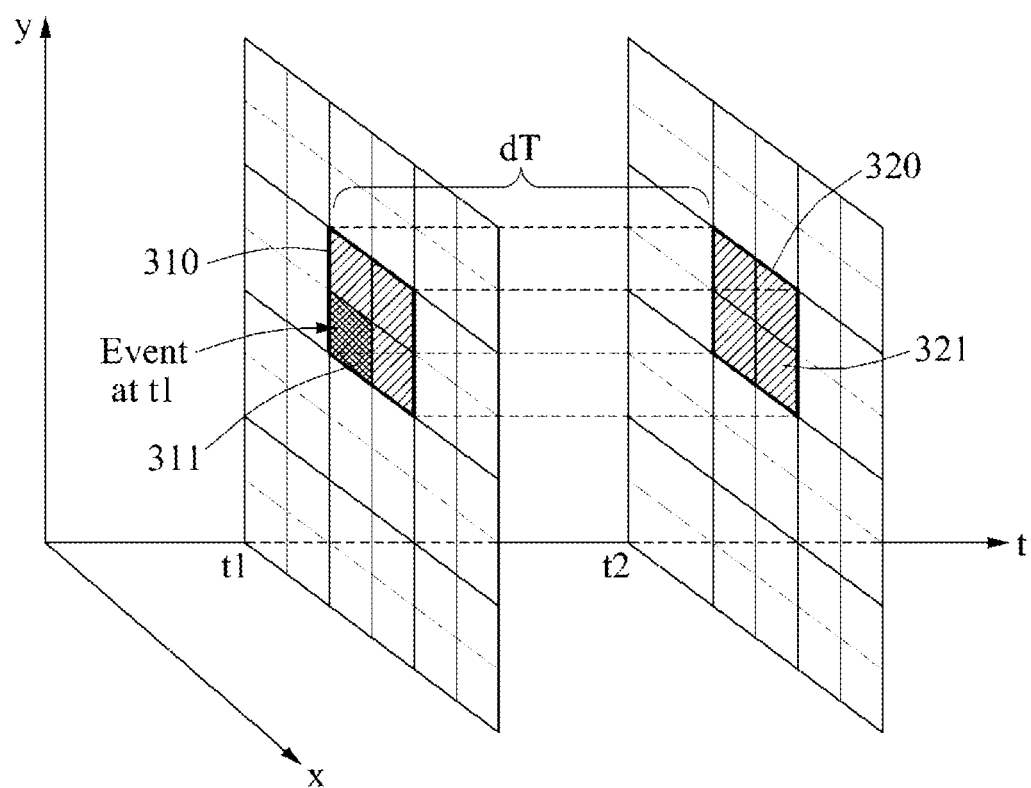
FIG. 3 is a diagram illustrating a spatiotemporal correlation scheme, according to an exemplary embodiment.

FIG. 3 is a diagram illustrating a spatiotemporal correlation principle, according to an exemplary embodiment. Referring to FIG. 3, event signals within blocks, for example, 2×2 blocks, of sensing pixels may be projected to a same filter cell, for example a filter cell 310. The sensing pixels that are projected to the same filter cell, for example a filter cell 310, may be defined as neighbor sensing pixels for a purpose of performing programmable spatial sub-sampling.

In such an example, each of the event signals projected to the filter cell 310 may open a time window that corresponds to the filter cell 310. Event signals that are generated subsequent to those generated by the sensing pixels that correspond to the filter cell 310 within the opened time window may be determined to have the spatiotemporal correlation. The subsequent event signals may be permitted to pass a filter. The time window may be used to provide temporal correlation, and a time window of a size dT may be programmed.

For example, referring also to FIG. 2, 2×2 sensing pixels of the sensor chip 210 may be projected to the filter cell 310. Here, a sub-sampling rate may be equal to 1 in a row and a column. When an event signal is generated in a predetermined sensing pixel 311 at t1, a spatiotemporal support may be provided for 4 sensing pixels that include the predetermined sensing pixel 311 during the time window dT. Concisely, when an event signal is generated in a sensing pixel 321 that corresponds to the same filter cell, for example a filter cell 320, at t2 within the time window dT, the event signal may be determined to have a spatiotemporal correlation.

Figure 4A:
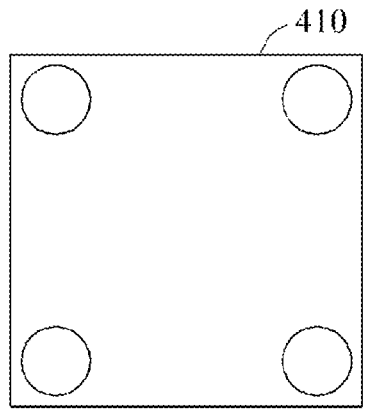
FIGS. 4A, 4B, and 4C are diagrams illustrating various examples of spatial correlation, according to an exemplary embodiment.
Figure 4B:
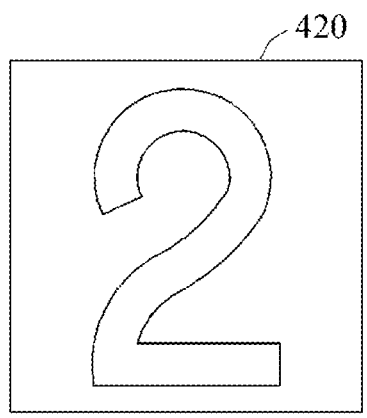
Figure 4C:
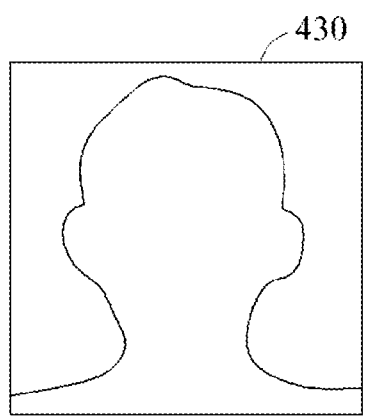

A spatial correlation in FIG. 3 may be determined with respect to an adjacent region that includes a location at which a preceding event signal is generated. However, the spatial correlation may be transformed in any of various forms. For example, referring to FIGS. 4A, 4B, and 4C, in a case of a first pattern 410, locations included in a plurality of separate regions may be set to be spatially correlated. Alternatively, in a case of a second pattern 420, locations included in a region that corresponds to a predetermined symbol, for example, a numeral 2, may be set to be spatially correlated. Alternatively, in a case of a third pattern 430, locations included in a region that corresponds to a predetermined shape, for example, a shape of a face, may be set to be spatially correlated.

Figure 5:
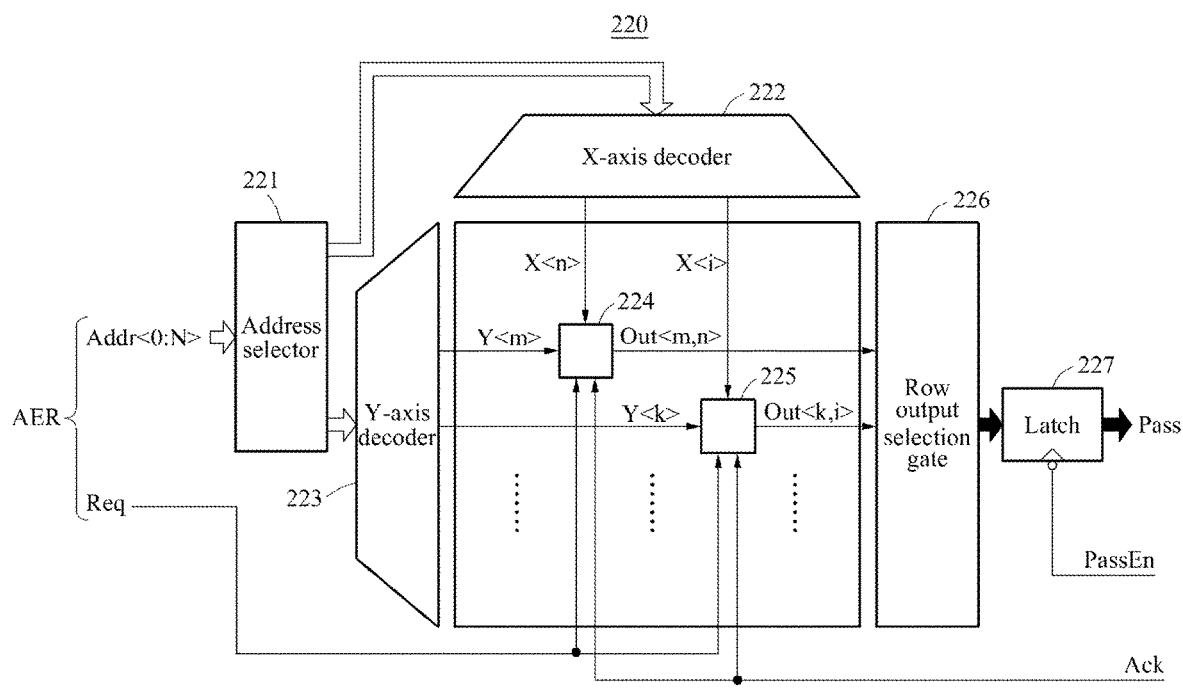
FIG. 5 is a diagram illustrating an architecture of a filter chip, according to an exemplary embodiment.

FIG. 5 is a diagram illustrating an architecture of the filter chip 220, according to an exemplary embodiment. Referring to FIG. 5, the filter chip 220 may receive a signal AER from the sensor chip 210. The signal AER may include event address bits Addr<0:N> and a request signal Req. The event address bits Addr<0:N> may correspond to an event signal.

The filter chip 220 may receive a response signal Ack and a pass enable signal PassEn from the logic chip 230. The pass enable signal PassEn may be input to a latch 227 to store an output state of a pass logic signal Pass. The filter chip 220 may output the pass logic signal Pass to the logic chip 230. For ease of description, two filter cells are illustrated. However, the filter chip 220 may include a plurality of filter cells in a form of matrix.

An address selector 221 may receive the event address bits Addr<0:N> included in the signal AER and route the received event address bits Addr<0:N> to input addresses of an X-axis decoder 222 and a Y-axis decoder 223. For example, the address selector 221 may perform sub-sampling on the event address bits Addr<0:N> included in the signal AER by ignoring a predetermined number of least significant bits (LSBs) of an address of an X-axis, for example, a column, and an address of a Y-axis, for example, a row. Here, a number of the LSBs may be programmed. Based on the aforementioned descriptions with reference to FIGS. 4A, 4B, and 4C, when the spatial correlation is transformed, the X-axis decoder 222 and the Y-axis decoder 223 may decode the event address bits Addr<0:N> to correspond to the transformed spatial correlation. The address selector 221 may determine an address sub-sampling rate that determines sensing pixels that spatially neighbor each other.

A receptive field 224 or a receptive field 225 may be selected based on outputs of the X-axis decoder 222 and the Y-axis decoder 223. The event-based sensor 100 may activate event signals of sensing pixels that correspond to the receptive field 224 or the receptive field 225. For example, the event-based sensor 100 may output event signals of sensing pixels that correspond to a receptive field in lieu of filtering the event signals thereof.

The receptive field 224 or the receptive field 225 may correspond to a single filter cell of the filter chip 220 and to sensing pixels of the sensor chip 210 projected to the single filter cell. The event-based sensor 100 may greatly reduce an amount of power consumption by performing power-on of a filter cell selected based on the outputs of the X-axis decoder 222 and the Y-axis decoder 223. Exemplary embodiments may reduce a response speed by additionally using a transmit gate, for example, a row output selection gate 226, that permits an output of a row selected from among an entire array.

Figure 6:
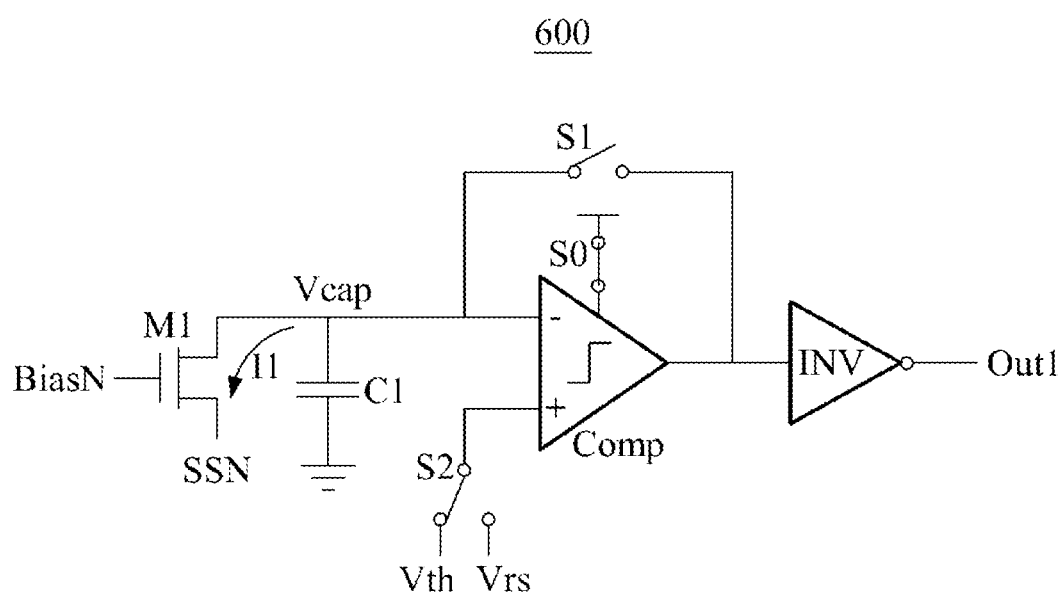
FIG. 6 is a diagram illustrating a discharge-compare-reset circuitry that is configured to determine a timing correlation within a filter cell, according to an exemplary embodiment.

FIG. 6 is a diagram illustrating a discharge-compare-reset circuitry that is configured to determine a timing correlation within a filter cell 600, according to an exemplary embodiment. Referring to FIG. 6, the filter cell 600 includes a comparer Comp, a capacitor C1 configured to store event timing information, and a transistor M1 configured to discharge a capacitor. For ease of description, a digital logic configured to control switches is not illustrated in FIG. 6. When an event signal is input to a receptive field, for example, when a filter cell is selected by logical AND with respect to a request signal Req of outputs of decoders, a second switch S2 may be connected to a threshold voltage Vth and a first switch S1 may be maintained in an OFF state.

The comparer Comp may compare a voltage Vcap to the threshold voltage Vth. When the voltage Vcap of the capacitor is greater than the threshold voltage Vth, a current event signal is determined to have been generated within a time window that corresponds to a preceding occurrence of an event. In such an example, an output signal Out1 is output, thereby generating a pass logic signal Pass. To prevent a glitch in the pass logic signal Pass, the pass logic signal Pass may be latched using the pass enable signal PassEn received by the logic chip 230 in FIG. 3.

When the logic chip 230 transmits a response signal Ack with respect to the event signal and the pass logic signal Pass, the first switch S1 may be ON and the second switch S2 may be connected to a reset voltage Vrs. Accordingly, a voltage of the capacitor C1 may be reset to the reset voltage Vrs. For example, the comparer Comp may be an operational amplifier. When the reset voltage Vrs is applied to a + input of the comparer Comp, a voltage of a − input of the comparer Comp may become the reset voltage Vrs by using a charge provided through the first switch S1.

When a line that transmits the request signal Req has a logic value that is equal to zero (0), the first switch S1 is OFF again. In such an example, a charge that is charged to the capacitor C1 via the transistor M1 may be discharged until a corresponding cell receives a subsequent event signal.

The time window that indicates a time interval at which the voltage Vcap of the capacitor is greater than the threshold voltage Vth may be expressed as shown in Equation 1.

$$dT = C*(Vrs - Vth)/I_1 \quad \text{[Equation 1]}$$

In Equation 1, $I_1$ denotes a current flowing through the transistor M1 and C denotes a capacitance of the capacitor C1. $I_1$ may be controlled by a configurable bias generator. For example, $I_1$ may be controlled to have a value between 100 femtoamperes (fA) and 20 microamperes (µA). $I_1$ may be controlled to have a relatively small value by connecting a source of the transistor M1 to a shifted source voltage (SSN) instead of a ground voltage GND.

Figure 7:
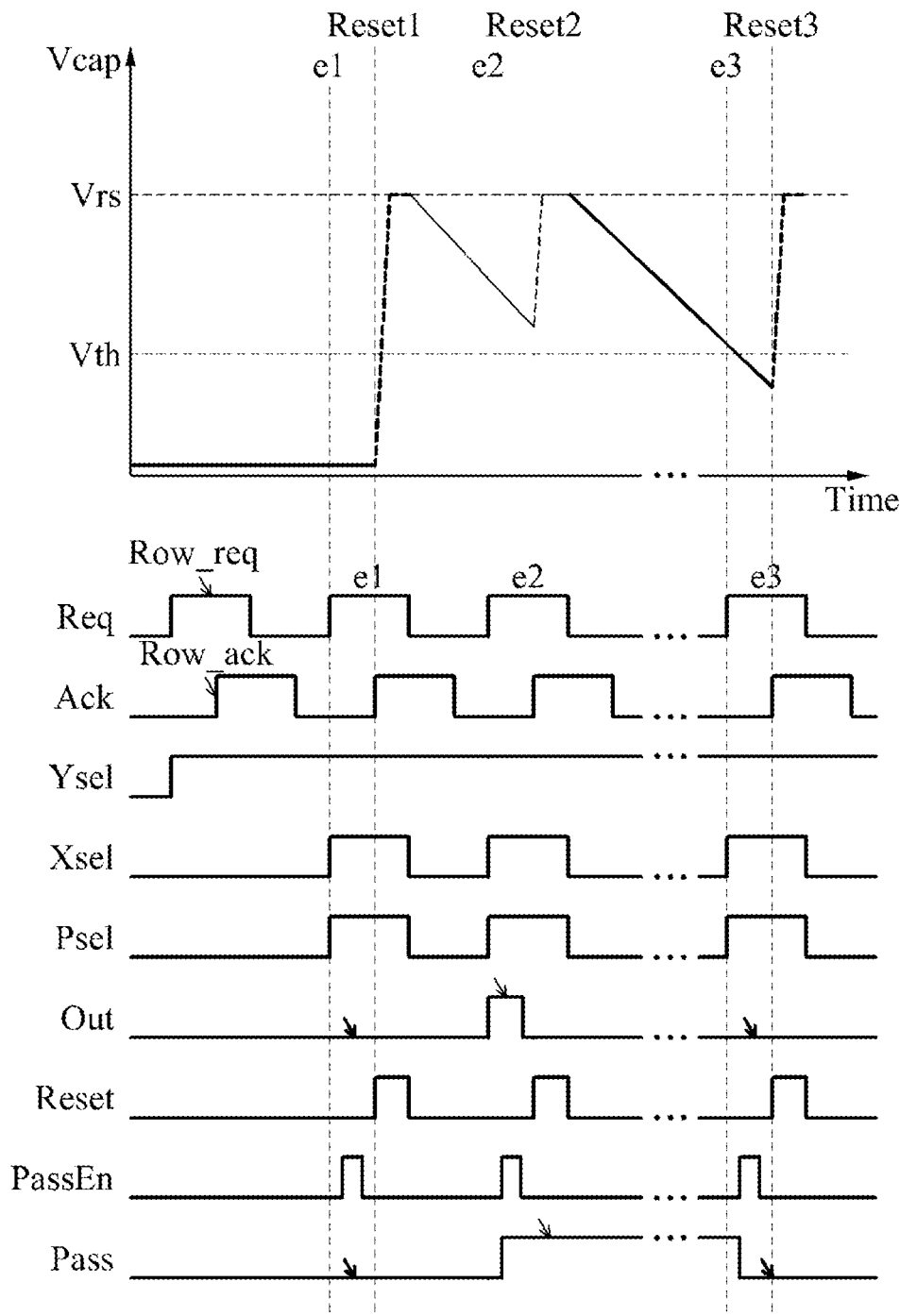
FIG. 7 is a timing diagram illustrating a case in which three event signals are received in a same filter cell, according to an exemplary embodiment.

FIG. 7 is a timing diagram illustrating a case in which three event signals e1, e2, and e3 are received in a same filter cell, according to an exemplary embodiment. For ease of description, a case in which the three event signals e1, e2, and e3 are generated from a same row of the sensor chip 210 may be assumed. In such an example, a row request signal Row_req may be shared with a row response signal Row_ack. Referring to FIG. 7, Xsel is an output of the X-axis decoder 222, Ysel is an output of the Y-axis decoder 223, and Psel is a logical AND of Xsel and Ysel. A filter cell may be selected by using Psel.

When a signal AER is received according to a generation of the first event signal e1, the request signal Req has a logic value equal to 1. The event address bits Addr<0:> are decoded so that Xsel and Ysel are generated. The voltage Vcap and the threshold voltage Vth are compared in a filter cell selected by Xsel and Ysel, and a result of the comparing may be output. Since the voltage Vcap is less than the threshold voltage Vth at a point in time at which the first event signal e1 is generated, an output signal OUT that has a logic value equal to 0 may be output.

The pass enable signal PassEn may have a logic value equal to 1 after a predetermined delay after the pass logic signal Pass is generated, or being on standby. Alternatively, the pass enable signal PassEn may have the logic value equal to 1 subsequent to the request signal Req having the logic value equal to 1. The pass enable signal PassEn may be driven by the logic chip 230 in FIG. 2. According to the output signal Out at a point in time at which the pass enable signal PassEn has a logic value equal to 1, an output state of the pass logic signal Pass may be determined.

The logic chip 230 that receives the pass logic signal Pass may output the response signal Act that has a logic value equal to 1. In response to the response signal Ack, the voltage Vcap may be reset in the filter cell selected by Xsel and Ysel. The reset signal Reset may be a logical AND of the response signal Ack and Psel. After the predetermined delay subsequent to the response signal Ack having the logic value 1, the response signal Req may have the logic value equal to 0. When the response signal Req has the logic value equal to 0, a charge that is charged to the capacitor C1 of the filter cell selected by Xsel and Ysel may begin to be discharged.

Subsequently, when the signal AER is received according to a generation of the event signal e2, aforementioned operations may be iteratively performed. In such a case, since the voltage Vcap is greater than the threshold voltage Vth, the output signal Out and the pass logic signal Pass that has the logic value equal to 1 may be output. Since the voltage Vcap gradually decreases as time elapses, the output signal Out and the pass logic signal Pass that has the logic value equal to 1 may be output when a new event signal is generated before the voltage Vcap is less than the threshold voltage Vth.

In a case of the third event signal e3, since the voltage Vcap is less than the threshold voltage Vth at the point in time at which the voltage Vcap and the threshold voltage Vth are compared, the output signal Out and the pass logic signal Pass that has the logic value equal to 0 may be output.

Figure 8:
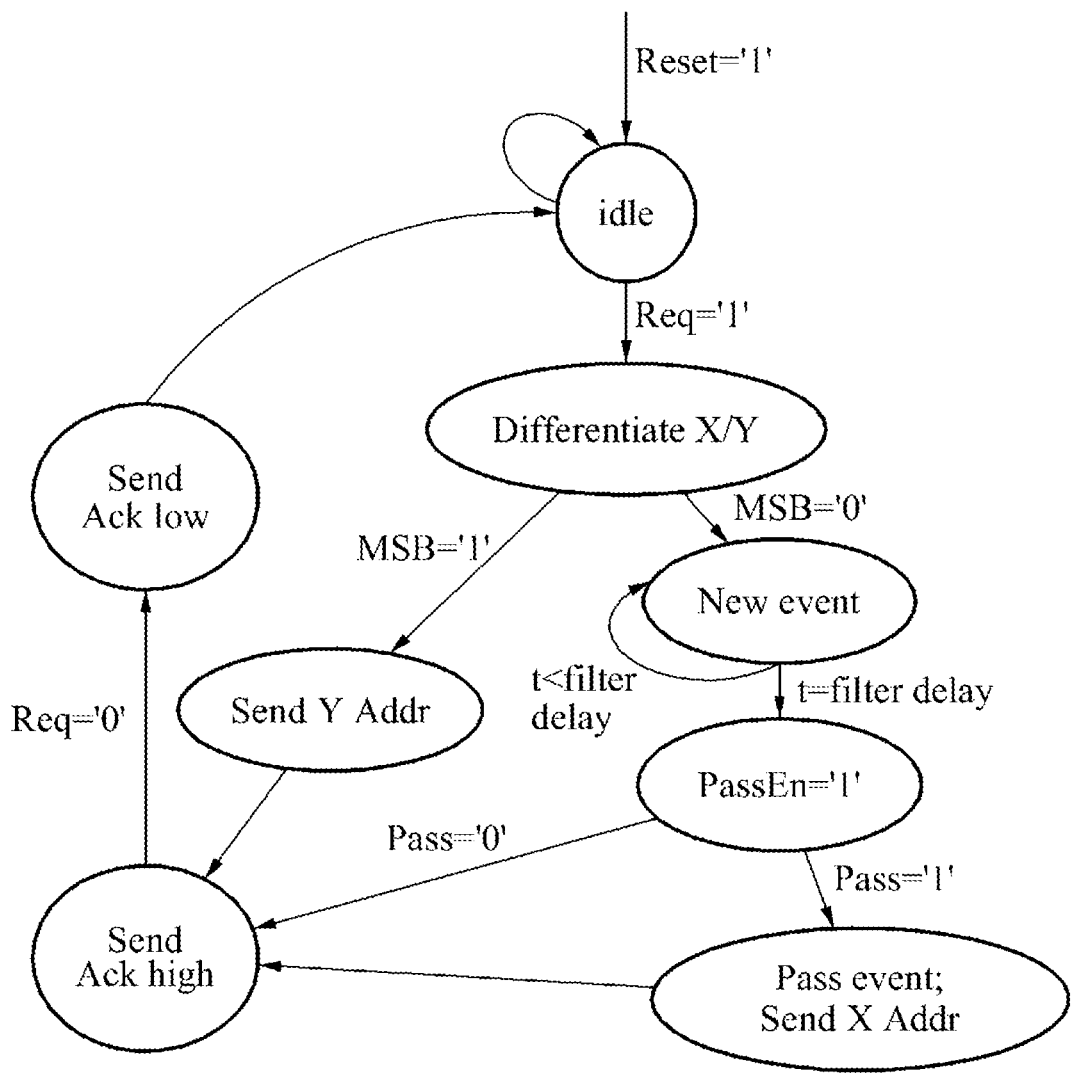
FIG. 8 is a diagram illustrating a finite state machine (FSM) of a logic chip, according to an exemplary embodiment.

FIG. 8 is a diagram illustrating a finite state machine (FSM) of the logic chip 230, according to an exemplary embodiment. When the activated response signal Req is received by the sensor chip 210, the logic chip 230 may determine, while remaining in an idle state, whether the response signal Req is preferentially received from a row or a column.

When the response signal Req is received from the column, the logic chip 230 may stand by until the pass logic signal Pass is generated, driven, or ready. The logic chip 230 may output the pass enable signal PassEn when the pass logic signal Pass is generated, driven, or ready. The logic chip 230 may determine whether an event signal is to be filtered or stored based on information that indicates whether the pass logic signal Pass has a logic value that is equal to 1 or 0. Subsequently, the logic chip 230 may output the response signal Ack to the sensor chip 210 and the filter chip 220.

Figure 9:
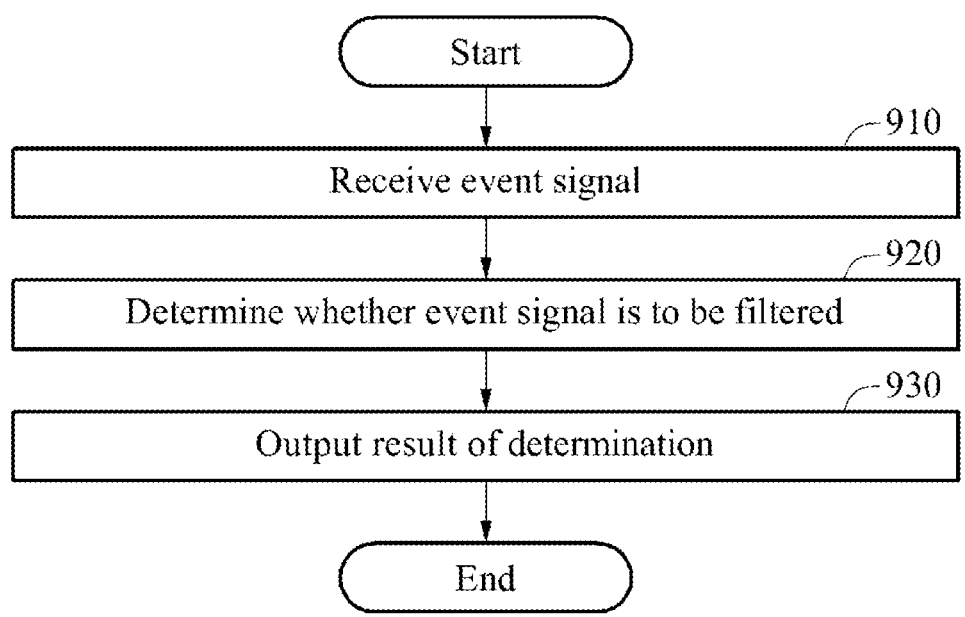
FIG. 9 is a flowchart illustrating an operating method that is performable by using a processor, according to an exemplary embodiment.

FIG. 9 is a flowchart illustrating an operating method that is performable by using a processor, according to an exemplary embodiment. Referring to FIG. 9, the operating method of a processor according to an exemplary embodiment includes operation 910 of receiving an event signal generated by an event-based sensor, operation 920 of determining whether the event signal is to be filtered based on at least one of a first condition associated with a time at which an event is detected, a second condition associated with a space in which the event is detected, and a third condition based on a spatiotemporal correlation among respective occurrences of the event, and operation 930 of outputting a result of the determination.

Operation 920 may be provided in a form of a software module. In operation 920, a correlation filter scheme may be performed, for example, a correlation filter scheme may be performed based on Java. The software module may use parameters, for example, an integrating current $I_1$, a value of a capacitor Cap, a threshold value Vth, a reset voltage Vrs, and a sub-sampling rate to determine a spatial support. Each of the integrating current $I_1$, the value of a capacitor Cap, the threshold value Vth, and the reset voltage Vrs may be set as a Gaussian distributed variable that has a standard deviation.

The software module may be performed as shown in algorithm in Table 1 below.

TABLE 1

| | |
|---|---|
| 1) | Calculate the ISI (Interspike Interval, the time interal between two consecutive events) from the event timestamp map lastTimesMap; |
| 2) | Calculate Vcap based on ISI and $I_1$; |
| 3) | Compare Vcap to Vth and determine whether to filter the event away or not; |
| 4) | Reset Vcap to Vrs and update lastTimesMap. |

The units described herein may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, a person of skill in the art will appreciate that a processing device may include multiple processing elements and multiple types of processing elements. For example, a processing device may include multiple processors, or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media that include program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as compact-disc read-only memory (CD ROM) discs and digital versatile discs (DVDs); magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those of skill in the art that changes may be made to these exemplary embodiments without departing from the principles and spirit of the present disclosure, the scope of which is defined by the claims and their equivalents.

What is claimed is:

1. An event-based sensor, comprising:
    a sensor module configured to generate an event signal comprising identification information that relates to an active pixel that detects an event, the active pixel being included among a plurality of sensing pixels;
    a determiner configured to determine whether the event signal is to be blocked based on a predetermined condition; and
    an outputter configured to output the event signal based on a result of a determination by the determiner as to whether the event signal is to be blocked, and to transmit, to the determiner, a response signal after the event signal has been output,
    wherein the determiner is further configured to reset a parameter that relates to determining the predetermined condition in response to receiving the response signal.

2. The event-based sensor of claim 1, wherein the predetermined condition comprises at least one from among:
    a first condition that relates to a time at which the event is detected;
    a second condition that relates to a space in which the event is detected; and
    a third condition based on a spatiotemporal correlation among respective occurrences of the event.

3. The event-based sensor of claim 2, wherein the first condition comprises at least one from among:
    first information indicating whether a current occurrence of the event is detected in a first time interval of a predetermined pattern;
    second information indicating whether the current occurrence of the event is detected within a second time interval with respect to a preceding time at which a preceding occurrence of the event was detected; and
    third information indicating whether the current occurrence of the event is detected in a third time interval associated with at least one temporal characteristic of the respective occurrences of the event.

4. The event-based sensor of claim 2, wherein the second condition comprises at least one from among:
    first information indicating whether a current occurrence of the event is detected in a first region of a predetermined pattern;
    second information indicating whether the current occurrence of the event is detected in a second region of a predetermined range with respect to a location at which a preceding occurrence of the event was detected;
    third information indicating whether the current occurrence of the event is detected in a third region that corresponds to an outline of an object; and
    fourth information indicating whether the current occurrence of the event is detected in a fourth region associated with a spatial characteristic of the respective occurrences of the event.

5. The event-based sensor of claim 2, wherein the third condition comprises:
    information indicating whether a current occurrence of the event is detected within a predetermined time interval with respect to a preceding time at which a preceding occurrence of the event was detected within a predetermined region.

6. The event-based sensor of claim 5, wherein the predetermined region comprises at least one from among:

an adjacent region comprising a location at which the current occurrence of the event is detected; and a region of a predetermined pattern comprising the location at which the current occurrence of the event is detected.

7. The event-based sensor of claim 1, wherein:
the sensor module is further configured to transmit the event signal to the determiner in response to the event,
the determiner is further configured to determine, in response to receiving the event signal, whether the event signal is blocked, and to transmit, to the outputter, a pass logic signal comprising the result of the determination as to whether the event signal is to be blocked in response to a pass enable signal received from the outputter, and
the outputter is further configured to the event signal based on the pass logic signal.

8. The event-based sensor of claim 1, wherein the outputter is further configured to output the event signal and information that relates to a time at which the event signal is generated.

9. The event-based sensor of claim 1, wherein the active pixel detects a change in incident light.

10. An event-based sensor, comprising:
a sensor module configured to generate an event signal comprising identification information that relates to an active pixel that detects an event, the active pixel being included among a plurality of sensing pixels;
a determiner configured to determine whether the event signal is to be filtered based on a predetermined condition; and
an outputter configured to output the event signal based on a result of a determination by the determiner as to whether the event signal is to be filtered, wherein:
the determiner comprises filter cells configured to divide the plurality of sensing pixels into a predetermined pattern,
each of the filter cells is configured to determine whether the event signal is to be filtered, and
each of the filter cells comprises:
a comparer;
a first switch configured to connect an output of the comparer to a first input of the comparer in response to receiving, from the outputter, a response signal that is associated with a previous occurrence of the event, and to disconnect the output of the comparer from the first input of the comparer in response to receiving, from the sensor module, a suspension of a request signal that is associated with a preceding occurrence of the event;
a second switch configured to connect a second input of the comparer to a reset voltage in response to receiving the response signal, and to connect the second input of the comparer to a threshold voltage in response to receiving the event signal;
a capacitor connected to the second input of the comparer; and
a transistor configured to discharge a charge from the capacitor based on a predetermined current capacity.

11. The event-based sensor of claim 10, wherein the predetermined current capacity is set based on at least one from among a gate voltage of the transistor and a source voltage of the transistor.

12. An operating method that is performable by using a processor, the operating method comprising:
receiving an event signal generated by an event-based sensor, the event signal comprising identification information that relates to an active pixel that detects an event;
determining, by the processor, whether the event signal is to be blocked based on a first condition that relates to a time at which a current occurrence of the event is detected;
outputting the event signal according to a result of the determining; and
resetting a parameter that relates to the determining after outputting the event signal.

13. The operating method of claim 12, wherein the first condition comprises at least one from among:
first information indicating whether the current occurrence of the event is detected in a first time interval of a predetermined pattern;
second information indicating whether the current occurrence of the event is detected within a second time interval with respect to a time at which a preceding occurrence of the event was detected; and
third information indicating whether the current occurrence of the event is detected in a third time interval associated with at least one temporal characteristic of respective occurrences of the event.

14. The operating method of claim 12, wherein the first condition comprises information indicating whether the current occurrence of the event is detected within a predetermined time interval with respect to a time at which a preceding occurrence of the event was detected within a predetermined region.

15. A non-transitory computer-readable storage medium which stores a computer program that includes instructions configured to cause a computer to perform the operating method of claim 12.

* * * * *